United States Patent
Peng et al.

(10) Patent No.: US 10,491,783 B2
(45) Date of Patent: Nov. 26, 2019

(54) COLOR VECTOR CONVERSION METHOD AND DEVICE APPLICABLE FOR DISPLAY DEVICE

(71) Applicant: BOE TECHNOLOGY GROUP CO., LTD., Beijing (CN)

(72) Inventors: Kuanjun Peng, Beijing (CN); Wei Qin, Beijing (CN); Xiaolong Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/222,000

(22) Filed: Dec. 17, 2018

(65) Prior Publication Data

US 2019/0335063 A1 Oct. 31, 2019

(30) Foreign Application Priority Data

Apr. 28, 2018 (CN) .......................... 2018 1 0403756

(51) Int. Cl.
- H04N 1/60 (2006.01)
- H04N 1/64 (2006.01)
- H04N 9/64 (2006.01)

(52) U.S. Cl.
CPC ......... *H04N 1/6016* (2013.01); *H04N 1/6058* (2013.01); *H04N 9/64* (2013.01)

(58) Field of Classification Search
CPC combination set(s) only.
See application file for complete search history.

(56) References Cited

U.S. PATENT DOCUMENTS

2008/0074717 A1* 3/2008 Blonde ................ G06T 11/001
358/520

* cited by examiner

*Primary Examiner* — Helen Zong
(74) *Attorney, Agent, or Firm* — Foley & Lardner LLP (57) ABSTRACT

The present disclosure relates to a color vector conversion method and device suitable for a display device. The method includes determining a three-dimensional vector of a first intersection point according to the three-dimensional vector of the to-be-converted point and a three-dimensional vector of a reference point. The method includes determining a three-dimensional vector of a second intersection point according to the three-dimensional vector of the first intersection point and a three-dimensional vector of a first vertex. The method includes converting the three-dimensional vector of the second intersection point to an N-dimensional vector according to N-dimensional vectors of two endpoints located on the first side. The method includes determining an N-dimensional vector of the first intersection point according to the N-dimensional vector of the second intersection point. The method includes determining an N-dimensional vector of the to-be-converted point according to the N-dimensional vector of the first intersection point.

16 Claims, 4 Drawing Sheets

COLOR VECTOR CONVERSION METHOD AND DEVICE APPLICABLE FOR DISPLAY DEVICE

CROSS REFERENCE

The present application is based upon and claims priority to Chinese Patent Application No. 201810403756.9, filed on Apr. 28, 2018, and the entire contents thereof are incorporated herein by reference.

TECHNICAL FIELD

The present disclosure relates to display technologies, and in particular, to a color vector conversion method and device applicable for a display device.

BACKGROUND

As people become more demanding on the colors of display products, multi-primary color display (MPC) products have become a reliable solution for improving colors.

At present, there are many RGBY and RGBW products on the market. Compared with RGB three primary colors display, these products have a better visual experience in some colors and are favored by more and more consumers.

In multi-primary color display (MPC) products, there are an algorithm for converting from RGB signals to multi-color signals, which is directly related to the final display quality of the product. Currently, in the conventional multi-color displays, the x, y, and z values of the input color (i.e., the input signals corresponding to the R, G, and B sub-pixels) are often calculated, and then are substituted into a color synthesis equation, and the optimal ratio of individual pixels of the colors is sought. In this way, the expression of the three-color signal is realized by multi-color.

However, this method directly leads to a large increase in the amount of calculation, and for a display device of more than four colors, it becomes extremely difficult to solve the color synthesis equation.

At the same time, because the methods in related arts are based on the true x, y, and z values of the colors, it becomes extremely difficult to adjust the algorithm in a targeted way.

It should be noted that the information disclosed in the Background section above is only for enhancing the understanding of the background of the present disclosure, and thus may include information that does not constitute prior art known to those of ordinary skill in the art.

SUMMARY

Arrangements of the present disclosure provide a color vector conversion method and device suitable for a display device.

According to an aspect of the present disclosure, there is provided color vector conversion method applicable for a display device. The method is used for converting a color of a to-be-converted point in an RGB color space from a three-dimensional vector including three color channels to N-dimensional vector including N color channels. N is a positive integer greater than 3. The method includes in the RGB color space, determining a three-dimensional vector of a first intersection point according to the three-dimensional vector of the to-be-converted point and a three-dimensional vector of a reference point. The to-be-converted point and the first intersection point are on a same straight line, and the first intersection point is located on a first surface in the RGB color space that has a shortest distance from the to-be-converted point. The method includes determining a three-dimensional vector of a second intersection point according to the three-dimensional vector of the first intersection point and a three-dimensional vector of a first vertex. The first vertex is any one of vertices on the first surface, and the second intersection point, the first intersection point and the first vertex are on a same straight line, and the second intersection point is located on a first side of the first surface. The method includes converting the three-dimensional vector of the second intersection point to an N-dimensional vector of the second intersection point according to N-dimensional vectors of two endpoints located on the first side. The method includes determining an N-dimensional vector of the first intersection point according to the N-dimensional vector of the second intersection point. The method includes determining an N-dimensional vector of the to-be-converted point according to the N-dimensional vector of the first intersection point.

According to an exemplary arrangement, the method further includes determining a polyhedron which the to-be-converted point belongs to. The polyhedron is formed by the reference point and the first surface in the RGB space, and the to-be-converted point is located in the polyhedron. The method further includes determining an intersection point between a straight line from the reference point to the to-be-converted point and a bottom surface of the polyhedron as the first intersection point.

According to an exemplary arrangement, converting the three-dimensional vector of the second intersection point to an N-dimensional vector according to N-dimensional vectors of two endpoints located on the first side includes determining a distance Lx between the second intersection point and one of the two endpoints of the first side and a distance Ly between the two endpoints of the first side. Such an operation further includes determining the N-dimensional vector of the second intersection point based on the following formula:

$$S_{INT2} = S_{end1} \cdot \frac{Lx}{Ly} + S_{end2} \cdot \frac{Ly - Lx}{Ly}$$

$S_{INT2}$ represents the N-dimensional vector of the second intersection point, $S_{end1}$ represents an N-dimensional vector corresponding to one of the two endpoints of the first side, $S_{end2}$ represents an N-dimensional vector of the other one of the two endpoints of the first side.

According to an exemplary arrangement, determining the N-dimensional vector of the first intersection point according to the N-dimensional vector of the second intersection point includes determining the N-dimensional vector of the first intersection point based on the following formula $$S_{INT1} = S_{INT2} \cdot \frac{Lx1}{Ly1} + S_{vertex} \cdot \frac{Ly1 - Lx1}{Ly1}$$

$S_{INT1}$ represents the N-dimensional vector of the first intersection point, $S_{vertex}$ represents an N-dimensional vector of the first vertex on the first surface, Lx1 represents a distance between the first vertex and the first intersection point, and Ly1 represents a distance between the first vertex and the second intersection point.

According to an exemplary arrangement, determining the N-dimensional vector of the to-be-converted point according to the N-dimensional vector of the first intersection point includes determining the N-dimensional vector of the to-be-converted point based on the following formula:

$$S_{to-be-converted} = S_{INT1} \cdot \frac{Lx2}{Ly2} + S_{ref} \cdot \frac{Ly2 - Lx2}{Ly2}$$

$S_{to-be-converted}$ represents the N-dimensional vector of the to-be-converted point, $S_{ref}$ represents the N-dimensional vector of the reference point, Lx2 represents a distance between the to-be-converted point and the first intersection point, and Ly2 represents a distance between the reference point and the first intersection point.

According to an exemplary arrangement, N is equal to 6.

According to an exemplary arrangement, the method further includes generating a color lookup table based on a correspondence between three color channels of the three-dimensional vector of the to-be-converted point and N color channels of the N-dimensional vector of the to-be-converted point. The method further includes storing the color lookup table in the display device.

According to an exemplary arrangement, the RGB color space is a cubic color space.

According to another aspect of the present disclosure, there is provided a color vector conversion device applicable for a display device. The device is used for converting a color of a to-be-converted point in an RGB color space from a three-dimensional vector including three color channels to N-dimensional vector including N color channels. N is a positive integer greater than 3.

The device includes a processor, a memory, storing program instructions which are executable by the processor. The processor is configured to perform the method as described above.

BRIEF DESCRIPTION OF THE DRAWINGS

The above and other features and advantages of the present disclosure will become more apparent from the detailed description by describing exemplary arrangements thereof in detail by referring to the drawings. It is apparent that the drawings in the following description show only some of the arrangements of the present disclosure, and other drawings may be obtained by those skilled in the art without departing from the drawings described herein. In the drawings.

LISTING OF A PART OF THE REFERENCE SIGNS

C: cyan vertex
W: white vertex
B: blue vertex
P: purple vertex
GY: gray point
G: green vertex
Y: yellow vertex
K: black vertex
R: red vertex
INT1: first intersection point
INT2: second intersection point
T: to-be-converted point

DETAILED DESCRIPTION

Example arrangements will now be described more fully with reference to the accompanying drawings. However, the arrangements can be implemented in a variety of forms and should not be construed as being limited to the examples set forth herein; rather, these arrangements are provided so that this disclosure will be more complete so as to convey the idea of the exemplary arrangements to those skilled in this art. The described features, structures, or characteristics in one or more arrangements may be combined in any suitable way.

In addition, the drawings are merely schematic representations of the present disclosure and are not necessarily drawn to scale. The same reference numerals in the drawings denote the same or similar parts, and the repeated description thereof will be omitted.

In a three-color display, for a single pixel including three differently colored sub-pixels, three signals of RGB are received, and the three signals are truly displayed to achieve a desired color display.

However, in a multi-color display device, a single pixel may include sub-pixels of more than three colors, and the data-driven input is still the data signal of the three color components of RGB. How to realize the mapping relationship between such three-color signals to multi-color signals is a problem that needs to be solved in multi-color display.

Figure 1:
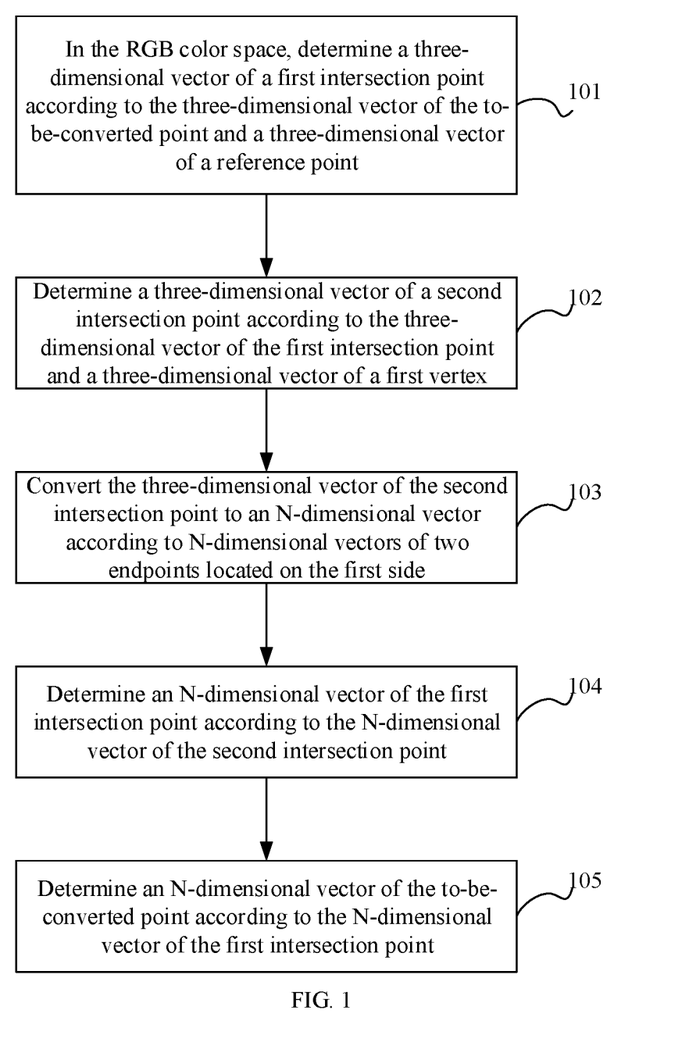
FIG. 1 shows a flow chart of a color vector conversion method according to an arrangement of the present disclosure.

The present disclosure provides a color vector conversion method and device applicable for a display device for converting a color of a to-be-converted point in an RGB color space from a three-dimensional vector including three color channels to N-dimensional vector including N color channels. N is a positive integer greater than 3. The flow chart of the method is shown in FIG. 1.

In block 101, in the RGB color space, a three-dimensional vector of a first intersection point is determined according to the three-dimensional vector of a to-be-converted point and a three-dimensional vector of a reference point. The to-be-converted point and the first intersection point are on the same straight line, and the first intersection point is located on a first surface in the RGB color space that has the shortest distance from the to-be-converted point.

In block 102, the three-dimensional vector of a second intersection is determined according to the three-dimensional vector of the first intersection point and the three-dimensional vector of a first vertex. The first vertex is any one of vertices on the first surface. The second intersection point, the first intersection point and the first vertex are on the same straight line. The second intersection point is located on a first side of the first surface.

In block 103, the three-dimensional vector of the second intersection is converted to an N-dimensional vector according to N-dimensional vectors of two endpoints located on the first side In block 104, an N-dimensional vector of the first intersection point is determined according to the N-dimensional vector of the second intersection point.

In block 105, an N-dimensional vector of the to-be-converted point is determined according to the N-dimensional vector of the first intersection point.

In the technical solution provided by the arrangement of the present disclosure, in the RGB color space, the three-dimensional vector of the first intersection point is determined according to the three-dimensional vector of the to-be-converted point and the three-dimensional vector of the reference point. According to the three-dimensional vector of the first intersection point and the three-dimensional vector of the first vertex, the three-dimensional vector of the second intersection is determined, which is equivalent to projecting the to-be-converted point onto the surface in the RGB color space to obtain a projection point (i.e., the first intersection point), and then projecting the projection point onto the first side to obtain another projection point (i.e., the second intersection point). Then, the N-dimensional vector of the second intersection is determined based on the distance between the second intersection and one of the two endpoints of the first side and the three-dimensional vectors of the known two endpoints, and the N-dimensional vector of the first intersection point is determined based on the N-dimensional vector of the second intersection; the N-dimensional vector of the to-be-converted point is determined based on the N-dimensional vector of the first intersection point and the N-dimensional vector of the known reference point. It can be seen that in the above arrangement of the present disclosure, the determination of the N-dimensional vector of the to-be-converted point is mainly based on the distance between the first vertex and the projection point of the to-be-converted point and the N-dimensional vector of the known endpoint in the RGB space, and such determination does not involve in completed color equations, thus reducing the amount of calculation.

The implementation of the present disclosure is described below by using an example of RGB to RGBCMY conversion.

Figure 2:
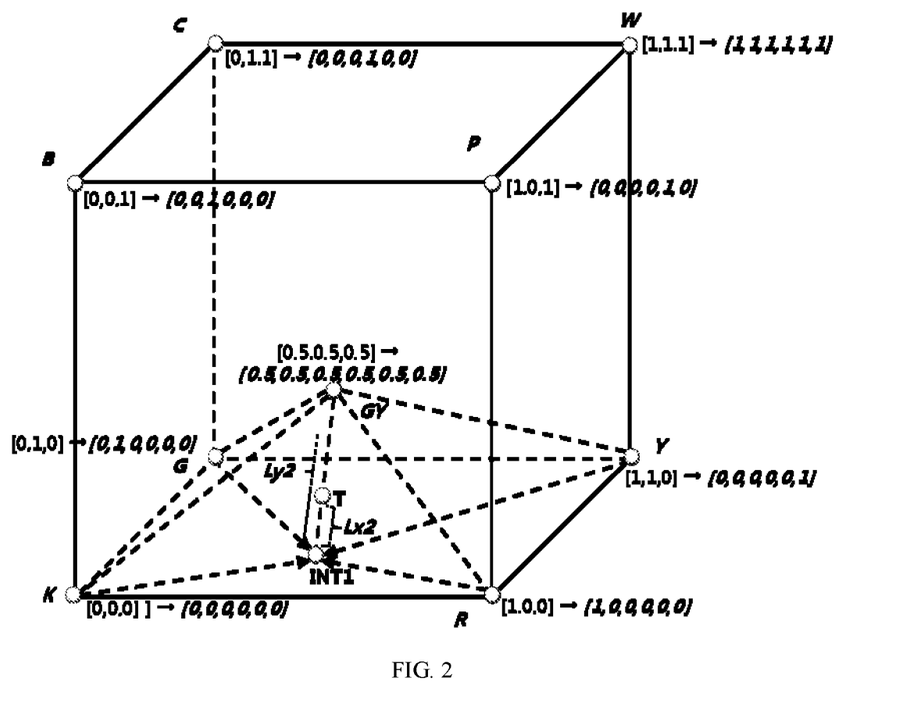
FIG. 2 shows an example of an RGB color space.

The RGB color space is shown in FIG. 2. The color space may be a space included in a unit cube. The coordinates of any point in the space (the three-dimensional vector [R, G, B]) respectively indicate the respective component of the point in the RGB three-color channel. In the RGB color space, R, G, and B have a value range of [0~1], and the values of R, G and B represent the x-axis, the y-axis, and the z-axis, respectively. R, G, B, M, C, and Y are vertices of a cube, in which point O is as an origin, side length is 1, and three-dimensional coordinate axes serve as sides. Any of the three-dimensional vector [R, G, B] including three color channels corresponds to a six-dimensional vector [r, g, b, c, m, y] including six color channels. That is, there is a mapping relationship between the three-dimensional vector [R, G, B] of the to-be-converted point and the six-dimensional vector [r, g, b, c, m, y] of the to-be-converted point.

In the RGB color space, the mapping relationship between three-dimensional vectors and six-dimensional vectors [r, g, b, c, m, y] of eight vertices (white vertex W, black vertex K, red vertex R, green vertex G, blue vertex B, cyan vertex C, purple vertex P, yellow vertex Y) is the easiest to obtain and is the easiest to adjust. If the mapping relationship of the four vertices of a surface is determined, the color points on the entire surface can be determined.

Referring to FIG. 2, taking the red vertex R as an example, the RGB coordinates of the red vertex R are [1,0,0] (i.e., the three-dimensional vector including three color channels of 1, 0, 0), and the corresponding six-dimensional vector is [1,0,0,0,0,0]. For another example, the three-dimensional vector of the yellow vertex Y is [1,1,0], and the corresponding six-dimensional vector is [0, 0, 0, 0, 0, 1].

In addition, in the RGB color space, the mapping relationship between the three-dimensional vector and the six-dimensional vector of the gray point GY can also be easily determined. The gray point is used as the reference point in arrangements of the present disclosure.

That is, in the RGB color space shown in FIG. 2, the six-dimensional vector of eight vertices and the gray point GY are known.

For a certain to-be-converted point, the position of the to-be-converted point in the RGB color space can be determined based on its three-dimensional vector. Then, the first intersection point between a straight line formed by the to-be-converted point and the reference point in the RGB color space and the first surface in the RGB color space can be determined. For the example shown in FIG. 2, the intersection point between the straight line from the gray point GY to the to-be-converted point T and the bottom surface of the RGB color space is determined as the first intersection point. The first intersection point can be seen as a projection point.

When determining the first intersection point, the polyhedron to which the to-be-converted point belongs may be determined, and the polyhedron is formed by the reference point and the first surface in the RGB color space, and the to-be-converted point is located in the polyhedron. The intersection point between the straight line from the reference point to the to-be-converted point and the bottom surface of the polyhedron is determined as the first intersection point.

Figure 3:
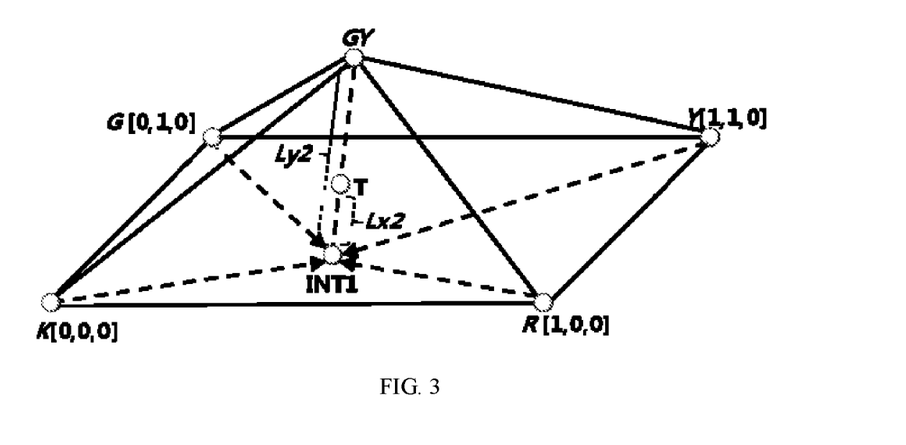
FIG. 3 shows one of a plurality of pentahedrons in the RGB color space of FIG. 2.

Referring to FIG. 2, the RGB space can be divided into six pentahedrons, and each pentahedron is as shown in FIG. 3. It can be determined which pentahedron the to-be-converted point is in based on the following ways.

(1) If the following formulas are satisfied, the to-be-converted point is located in the pentahedron with the surface formed by black, green, yellow and red vertices as the bottom surface and the gray point as the top point of the pentahedron:

$$G_{to\text{-}be\text{-}converted} \cdot \frac{B_{gray}}{G_{gray}} \geq B_{to\text{-}be\text{-}converted},$$

$$R_{to\text{-}be\text{-}converted} \cdot \frac{B_{gray}}{R_{gray}} \geq B_{to\text{-}be\text{-}converted},$$

$$(1 - G_{to\text{-}be\text{-}converted}) \cdot \frac{B_{gray}}{(1 - G_{gray})} \geq B_{to\text{-}be\text{-}converted},$$

$$(1 - R_{to\text{-}be\text{-}converted}) \cdot \frac{B_{gray}}{(1 - R_{gray})} \geq B_{to\text{-}be\text{-}converted}$$

(2) If the following formulas are satisfied, the to-be-converted point is located in the pentahedron with the surface formed by white, purple, blue, cyan vertices as the bottom surface and the gray point as the top point of the pentahedron:

$$G_{to\text{-}be\text{-}converted} \cdot \frac{B_{gray}}{G_{gray}} \leq B_{to\text{-}be\text{-}converted},$$

-continued $$R_{to\text{-}be\text{-}converted} \cdot \frac{B_{gray}}{R_{gray}} \leq B_{to\text{-}be\text{-}converted},$$

$$(1 - G_{to\text{-}be\text{-}converted}) \cdot \frac{B_{gray}}{(1 - G_{gray})} \leq B_{to\text{-}be\text{-}converted},$$

$$(1 - R_{to\text{-}be\text{-}converted}) \cdot \frac{B_{gray}}{(1 - R_{gray})} \leq B_{to\text{-}be\text{-}converted}$$

(3) If the following formulas are satisfied, the to-be-converted point is located in the pentahedron with the surface formed by black, red, purple and blue vertices as the bottom surface and the gray point as the top point of the pentahedron:

$$R_{to\text{-}be\text{-}converted} \cdot \frac{G_{gray}}{R_{gray}} \geq G_{to\text{-}be\text{-}converted},$$

$$B_{to\text{-}be\text{-}converted} \cdot \frac{G_{gray}}{B_{gray}} \geq G_{to\text{-}be\text{-}converted},$$

$$(1 - R_{to\text{-}be\text{-}converted}) \cdot \frac{G_{gray}}{(1 - R_{gray})} \geq G_{to\text{-}be\text{-}converted},$$

$$(1 - B_{to\text{-}be\text{-}converted}) \cdot \frac{G_{gray}}{(1 - B_{gray})} \geq G_{to\text{-}be\text{-}converted}$$

(4) If the following formulas are satisfied, the to-be-converted point is located in the pentahedron with the surface formed by white, cyan, green and yellow vertices as the bottom surface and the gray point as the top point of the pentahedron:

$$R_{to\text{-}be\text{-}converted} \cdot \frac{G_{gray}}{R_{gray}} \leq G_{to\text{-}be\text{-}converted},$$

$$B_{to\text{-}be\text{-}converted} \cdot \frac{G_{gray}}{B_{gray}} \leq G_{to\text{-}be\text{-}converted},$$

$$(1 - R_{to\text{-}be\text{-}converted}) \cdot \frac{G_{gray}}{(1 - R_{gray})} \leq G_{to\text{-}be\text{-}converted},$$

$$(1 - B_{to\text{-}be\text{-}converted}) \cdot \frac{G_{gray}}{(1 - B_{gray})} \leq G_{to\text{-}be\text{-}converted}$$

(5) If the following formulas are satisfied, the to-be-converted point is located in the pentahedron with the surface formed by black, green, cyan, and blue vertices as the bottom surface and gray point as the top point of the pentahedron:

$$B_{to\text{-}be\text{-}converted} \cdot \frac{R_{gray}}{B_{gray}} \geq R_{to\text{-}be\text{-}converted},$$

$$G_{to\text{-}be\text{-}converted} \cdot \frac{R_{gray}}{G_{gray}} \geq R_{to\text{-}be\text{-}converted},$$

$$(1 - B_{to\text{-}be\text{-}converted}) \cdot \frac{R_{gray}}{(1 - B_{gray})} \geq R_{to\text{-}be\text{-}converted},$$

$$(1 - G_{to\text{-}be\text{-}converted}) \cdot \frac{R_{gray}}{(1 - G_{gray})} \geq R_{to\text{-}be\text{-}converted}$$

(6) If the following formulas are satisfied, the to-be-converted point is located in the pentahedron with the surface formed by white, purple, red, yellow vertices as the bottom surface and the gray point as the top point of the pentahedron:

$$B_{to\text{-}be\text{-}converted} \cdot \frac{R_{gray}}{B_{gray}} \leq R_{to\text{-}be\text{-}converted},$$

$$G_{to\text{-}be\text{-}converted} \cdot \frac{R_{gray}}{G_{gray}} \leq R_{to\text{-}be\text{-}converted},$$

$$(1 - B_{to\text{-}be\text{-}converted}) \cdot \frac{R_{gray}}{(1 - B_{gray})} \geq R_{to\text{-}be\text{-}converted},$$

$$(1 - G_{to\text{-}be\text{-}converted}) \cdot \frac{R_{gray}}{(1 - G_{gray})} \geq R_{to\text{-}be\text{-}converted}$$

Figure 4:
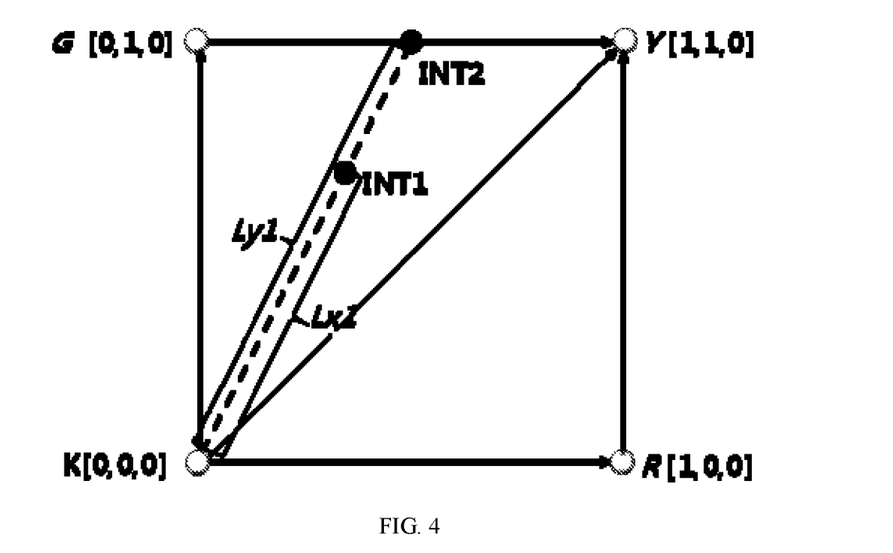
FIG. 4 shows a projection way of a second intersection point.
Figure 5:
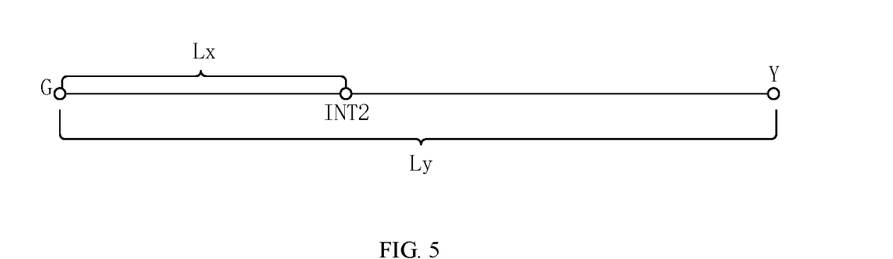
FIG. 5 shows a way in which a second color vector of the second intersection is determined.

Next, the three-dimensional vector of the second intersection point is determined according to the three-dimensional vector of the first intersection point and the three-dimensional vector of the first vertex. For example, as shown in FIG. 4, the second intersection point INT2 between the straight line from the black vertex K (i.e., the first vertex) to the first intersection point INT1 and the side formed by the green vertex G and the yellow vertex Y may be determined.

For example, the N-dimensional vector of the second intersection point INT2 can be determined as follows.

A distance Lx between the second intersection point INT2 and one of the two endpoints of the first side and a distance Ly between the two endpoints of the first side are determined.

The N-dimensional vector of the second intersection point is determined based on the following formula:

$$S_{INT2} = S_{end1} \cdot \frac{Lx}{Ly} + S_{end2} \cdot \frac{Ly - Lx}{Ly} \quad (1)$$

where, $S_{INT2}$ represents the N-dimensional vector of the second intersection point, $S_{end1}$ represents the N-dimensional vector corresponding to one of the two endpoints of the first side, $S_{end2}$ represents the N-dimensional vector of the other one of the two endpoints of the first side.

Taking FIG. 4 as an example, it is assumed that the straight line formed by the first intersection point INT1 and the black vertex K intersects with the side formed by the yellow vertex Y and the green vertex G in the RGB color space (this side is an example of the "first side" in the present disclosure) to obtain the second intersection INT2. First the distance Lx between the second intersection point INT2 and the green vertex G and the distance Ly between the yellow vertex Y and the green vertex G are determined. The six-dimensional vectors of the green vertex (assumed to be the first endpoint $S_{end\ 1}$) and the yellow vertex (assumed to be the second endpoint $S_{end\ 2}$) are known, and Lx, Ly, $S_{end1}$ and $S_{end2}$ are substituted into the formula (1) to obtain $S_{INT1}$, i.e., the six-dimensional vector of the second intersection point.

Then, the N-dimensional vector of the first intersection point INT1 is determined according to the N-dimensional vector of the second intersection point INT2. For example, the N-dimensional vector of the first intersection point INT1 may be determined based on the following formula:

$$S_{INT1} = S_{INT2} \cdot \frac{Lx1}{Ly1} + S_{vertex} \cdot \frac{Ly1 - Lx1}{Ly1} \quad (2)$$

wherein, $S_{INT1}$ represents the N-dimensional vector of the first intersection point, $S_{vertex}$ represents the N-dimensional vector of the first vertex of the first surface, Lx1 represents the distance between the first vertex and the first intersection point, and Ly1 represents the distance between the first vertex and the second intersection point.

Referring to FIG. 4, the six-dimensional vector of the second intersection point INT2 can be obtained by the above formula (1). In addition, the six-dimensional vector of the black vertex K is known. $S_{INT2}$ and the six-dimensional vector of the black vertex are substituted into the formula (2), and then the six-dimensional vector of the first intersection point INT1 $S_{INT1}$ can be determined.

Then, determining the N-dimensional vector of the to-be-converted point according to the N-dimensional vector of the first intersection point INT1 includes:

determining the N-dimensional vector of the to-be-converted point based on the following formula:

$$S_{to\text{-}be\text{-}converted} = S_{INT1} \cdot \frac{Lx2}{Ly2} + S_{ref} \cdot \frac{Ly2 - Lx2}{Ly2} \quad (3)$$

wherein $S_{to\text{-}be\text{-}converted}$ represents the N-dimensional vector of the to-be-converted point, $S_{ref}$ represents the N-dimensional vector of the reference point, Lx2 represents the distance between the to-be-converted point and the first intersection point INT1, and Ly2 represents the distance between the reference point and the first intersection point INT1.

Referring to FIG. 2, the six-dimensional vector $S_{ref}$ of the reference point (the gray point) is known. In addition, the distance Lx2 between the to-be-converted point and the first intersection point INT1 and the distance Ly2 between the gray point and the first intersection point INT1 may be determined. $S_{参考}$, Lx2, and Ly2 are substituted into the formula (3), and then the six-dimensional vector of the to-be-converted point can be determined, i.e., $S_{to\text{-}be\text{-}converted}$ in the formula (3).

As can be seen from the above process of determining the six-dimensional vector of the to-be-converted point, by projecting the to-be-converted point onto the bottom surface of the RGB color space and then projecting the to-be-converted point onto the first side of the bottom surface, the process of determining the vector becomes the process that determining the six-dimensional vector of the projection point of the to-be-converted point at the side formed by the yellow and green vertex based on the six-dimensional vector of the known vertices (e.g., the yellow vertex and the green vertex) and determining the six-dimensional vector of the projection point of the to-be-converted point at the bottom surface. The calculations involved in these processes are mainly proportional calculations based on known vectors to determine unknown vectors as shown in formulas (1)-(3), and the amount of calculation involved in these calculations is not complicated. Therefore, the color vector conversion from the three-dimensional vector RGB to the six-dimensional vector RGBCMY can be realized with a small amount of calculation.

In the above example, N=6 is used as an example. In fact, by adopting the technical solutions provided by the arrangements of the present disclosure, even if N is larger, for example, N is 8, an eight-dimensional vector of the to-be-converted point can be obtained based on the formulas (1)-(3) by the above technical solutions, and the amount of calculation involved is not large.

As has been mentioned in the foregoing arrangements, in the RGB color space, the six-dimensional vectors of eight vertices are known. In fact, not just the six-dimensional vectors, multi-dimensional vector of each vertex is known in RGB space. For example, referring to Table 1 below, it shows the three primary color vectors and the corresponding multi-color vectors in the MPC product. As can be clearly seen from Table 1, the correspondence between the three-dimensional vector and the six-dimensional vector (or a four-dimensional vector, a five-dimensional vector) of each vertex is easily determined.

| MPC product (three primary colors corresponding to multiple primary colors) color coordinate values | | | | | | | |
| --- | --- | --- | --- | --- | --- | --- | --- |
| color | black | red | orange | yellow | yellow-green | green | Cyan-green |
| [RGB] | [0 0 0] | [1 0 0] | [1 0.5 0] | [1 1 0] | [0.5 1 0] | [0 1 0] | [0 1 0.5] |
| [RGBW] | [0 0 0 0] | [1 0 0 0] | [1 0.5 0 0] | [1 1 0 0] | [0.5 1 0 0] | [0 1 0 0] | [0 1 0.5 0] |
| [RGBY] | [0 0 0 0] | [1 0 0 0] | [1 0 0 1] | [0 0 0 1] | [0 1 0 1] | [0 1 0 0] | [0 1 0.5 0] |
| [RGBCY] | [0 0 0 0 0] | [1 0 0 0 0] | [1 0 0 0 1] | [0 0 0 0 1] | [0 1 0 0 1] | [0 1 0 0 0] | [0 1 0 1 0] |
| [RGBCMY] | [0 0 0 0 0 0] | [1 0 0 0 0 0] | [1 0 0 0 0 1] | [0 0 0 0 0 1] | [0 1 0 0 0 1] | [0 1 0 0 0 0] | [0 1 0 1 0 0] |
| color | cyan | Cyan-blue | blue | Blue-purple | purple | purple-red | white |
| [RGB] | [0 1 1] | [0 0.5 1] | [0 0 1] | [0.5 0 1] | [1 0 1] | [1 0 0.5] | [1 1 1] |
| [RGBW] | [0 1 1 0] | [0 0.5 1 0] | [0 0 1 0] | [0.5 0 1 0] | [1 0 1 0] | [1 0 0.5 0] | [1 1 1 1] |
| [RGBY] | [0 1 1 0] | [0 0.5 1 0] | [0 0 1 0] | [0.5 0 1 0] | [1 0 1 0] | [1 0 0.5 0] | [1 1 1 1] |
| [RGBCY] | [0 0 0 1 0] | [0 0 1 1 0] | [0 0 1 0 0] | [0.5 0 1 0 0] | [1 0 1 0 0] | [1 0 0.5 0] | [1 1 1 1 1] |
| [RGBCMY] | [0 0 1 0 0 0] | [0 0 1 1 0 0] | [0 0 1 0 0 0] | [0 0 1 0 1 0] | [0 0 0 0 1 0] | [1 0 0 0 1 0] | [1 1 1 1 1 1] |

Figure 6:
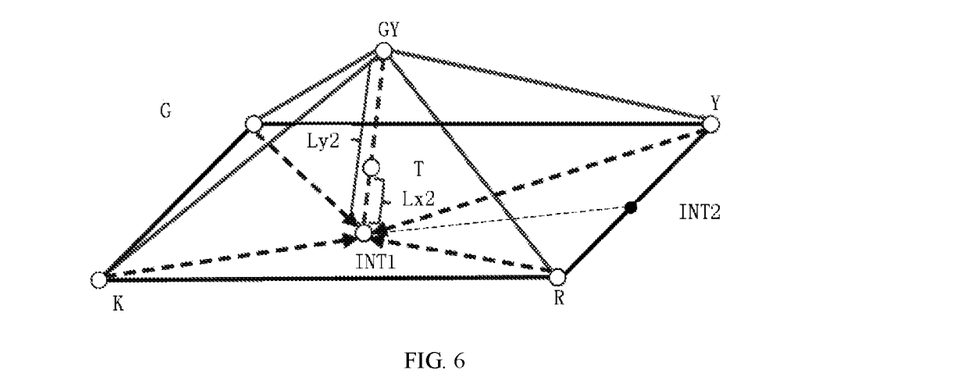
FIG. 6 shows another projection way of the second intersection point.

In FIG. 4, the straight line connecting the black vertex K and the first intersection point INT1 is projected onto the side formed by the yellow vertex Y and the green vertex G to obtain the second intersection INT2. In other arrangements, depending on the position of the to-be-converted point, for example, the straight line connecting the black vertex K and the first intersection point INT1 may also be projected onto the side formed by the red vertex R and the yellow vertex Y, as shown in FIG. 6. Of course, regardless of which side is projected, the N-dimensional vector of the second intersection INT2 is calculated in a way similar to that described with reference to FIG. 4.

In an arrangement of the present disclosure, a color lookup table is generated based on a correspondence between three color channels of the three-dimensional vector of the to-be-converted point and N color channels of the N-dimensional vector of the to-be-converted point. The color lookup table is stored in the display device.

When a display device such as a liquid crystal display performs multi-color display, the input is RGB three-color signals, and by searching the correspondence in advance in the lookup table, the N-dimensional vectors (for example, the six-dimensional vector) corresponding to the currently input RGB three-color signals can be known, so that fast color conversion can be achieved.

Figure 7:
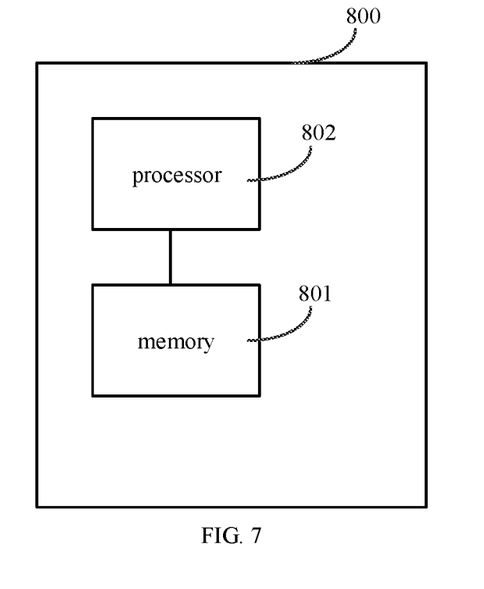
FIG. 7 shows a block diagram of a color vector conversion device according to an exemplary arrangement of the present disclosure.

In an arrangement of the present disclosure, a color vector conversion device suitable for a display device is also provided, as shown in FIG. 7. The device is used for converting a color of a to-be-converted point in an RGB color space from a three-dimensional vector including three color channels to N-dimensional vector including N color channels, wherein N is a positive integer greater than 3.

The color vector conversion device 800 can include a memory 801 and a processor 802. Computer program instructions which can be executed by the processor 802 are stored in the memory 801. The processor 802 executes computer programs to implement the methods described herein.

The memory 801 can be implemented by any type or a combination of volatile or non-volatile storage device, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk.

The device 800 can be various devices with computing and processing capabilities, and can include various input devices (e.g., user interface, keyboard, etc.), various output devices (e.g., loudspeakers, etc.) and display devices in addition to the memory 801 and the processor 802, which will not be elaborated herein.

An arrangement of the present disclosure further provides a computer readable storage medium storing computer programs, and when the computer programs are executed by the processor, the blocks of the method provided by the arrangements of the present disclosure are implemented.

It should be noted that although modules or units of devices for executing functions are described above, such division of modules or units is not mandatory. In fact, features and functions of two or more of the modules or units described above may be embodied in one module or unit in accordance with the arrangements of the present disclosure. Alternatively, the features and functions of one module or unit described above may be further divided into multiple modules or units.

In addition, although the various blocks of the method of the present disclosure are described in a particular order in the figures, this is not required or implied that the blocks must be performed in the specific order, or all the blocks shown must be performed to achieve the desired result. Additionally or alternatively, certain blocks may be omitted, multiple blocks may be combined into one block, and/or one block may be decomposed into multiple blocks and so on.

Other arrangements of the present disclosure will be apparent to those skilled in the art. The present application is intended to cover any variations, uses, or adaptations of the present disclosure, which are in accordance with the general principles of the present disclosure and include common general knowledge or conventional technical means in the art that are not disclosed in the present disclosure. The specification and arrangements are illustrative, and the real scope and spirit of the present disclosure is defined by the appended claims.

What is claimed is:

1. A color vector conversion method applicable for a display device, for converting a color of a to-be-converted point in an RGB color space from a three-dimensional vector comprising three color channels to N-dimensional vector comprising N color channels, wherein N is a positive integer greater than 3;

wherein the method comprises:
in the RGB color space, determining a three-dimensional vector of a first intersection point according to the three-dimensional vector of the to-be-converted point and a three-dimensional vector of a reference point; wherein the to-be-converted point and the first intersection point are on a same straight line, and the first intersection point is located on a first surface in the RGB color space that has a shortest distance from the to-be-converted point;

determining a three-dimensional vector of a second intersection point according to the three-dimensional vector of the first intersection point and a three-dimensional vector of a first vertex, wherein the first vertex is any one of vertices on the first surface, and the second intersection point, the first intersection point and the first vertex are on a same straight line, and the second intersection point is located on a first side of the first surface;

converting the three-dimensional vector of the second intersection point to an N-dimensional vector of the second intersection point according to N-dimensional vectors of two endpoints located on the first side;

determining an N-dimensional vector of the first intersection point according to the N-dimensional vector of the second intersection point; and determining an N-dimensional vector of the to-be-converted point according to the N-dimensional vector of the first intersection point.

2. The method according to claim 1, further comprising:
determining a polyhedron which the to-be-converted point belongs to, wherein the polyhedron is formed by the reference point and the first surface in the RGB space, and the to-be-converted point is located in the polyhedron; and determining an intersection point between a straight line from the reference point to the to-be-converted point and a bottom surface of the polyhedron as the first intersection point.

3. The method according to claim 1, wherein converting the three-dimensional vector of the second intersection point to an N-dimensional vector of the second intersection point according to N-dimensional vectors of two endpoints located on the first side comprises:

determining a distance Lx between the second intersection point and one of the two endpoints of the first side and a distance Ly between the two endpoints of the first side; and determining the N-dimensional vector of the second intersection point based on the following formula:

$$S_{INT2} = S_{end1} \cdot \frac{Lx}{Ly} + S_{end2} \cdot \frac{Ly - Lx}{Ly}$$

wherein $S_{INT2}$ represents the N-dimensional vector of the second intersection point, $S_{end1}$ represents an N-dimensional vector corresponding to one of the two endpoints of the first side, $S_{end2}$ represents an N-dimensional vector of the other one of the two endpoints of the first side.

4. The method according to claim 3, wherein determining the N-dimensional vector of the first intersection point according to the N-dimensional vector of the second intersection point comprises:

determining the N-dimensional vector of the first intersection point based on the following formula:

$$S_{INT1} = S_{INT2} \cdot \frac{Lx1}{Ly1} + S_{vertex} \cdot \frac{Ly1 - Lx1}{Ly1}$$

wherein $S_{INT1}$ represents the N-dimensional vector of the first intersection point, $S_{vertex}$ represents an N-dimensional vector of the first vertex on the first surface, Lx1 represents a distance between the first vertex and the first intersection point, and Ly1 represents a distance between the first vertex and the second intersection point.

5. The method according to claim 4, wherein determining the N-dimensional vector of the to-be-converted point according to the N-dimensional vector of the first intersection point comprises:

determining the N-dimensional vector of the to-be-converted point based on the following formula:

$$S_{to\text{-}be\text{-}converted} = S_{INT1} \cdot \frac{Lx2}{Ly2} + S_{ref} \cdot \frac{Ly2 - Lx2}{Ly2}$$

wherein $S_{to\text{-}be\text{-}converted}$ represents the N-dimensional vector of the to-be-converted point, $S_{ref}$ represents the N-dimensional vector of the reference point, Lx2 represents a distance between the to-be-converted point and the first intersection point, and Ly2 represents a distance between the reference point and the first intersection point.

6. The method according to claim 1, wherein N is equal to 6.

7. The method according to claim 1, further comprising:
generating a color lookup table based on a correspondence between three color channels of the three-dimensional vector of the to-be-converted point and N color channels of the N-dimensional vector of the to-be-converted point; and
storing the color lookup table in the display device.

8. The method according to claim 1, wherein the RGB color space is a cubic color space.

9. A color vector conversion device applicable for a display device, for converting a color of a to-be-converted point in an RGB color space from a three-dimensional vector comprising three color channels to N-dimensional vector comprising N color channels, wherein N is a positive integer greater than 3;
wherein the device comprises:
a processor;
a memory, storing program instructions which are executable by the processor;
wherein the processor is configured to:
in the RGB color space, determine a three-dimensional vector of a first intersection point according to the three-dimensional vector of the to-be-converted point and a three-dimensional vector of a reference point; wherein the to-be-converted point and the first intersection point are on a same straight line, and the first intersection point is located on a first surface in the RGB color space that has the shortest distance from the to-be-converted point;
determine a three-dimensional vector of a second intersection point according to the three-dimensional vector of the first intersection point and a three-dimensional vector of a first vertex, wherein the first vertex is any one of vertices on the first surface, and the second intersection point, the first intersection point and the first vertex are on a same straight line, and the second intersection point is located on a first side of the first surface;
convert the three-dimensional vector of the second intersection point to an N-dimensional vector of the second intersection point according to N-dimensional vectors of two endpoints located on the first side;
determine an N-dimensional vector of the first intersection point according to the N-dimensional vector of the second intersection point; and
determine an N-dimensional vector of the to-be-converted point according to the N-dimensional vector of the first intersection point.

10. The device according to claim 9, wherein the processor is further configured to:
determine a polyhedron which the to-be-converted point belongs to, wherein the polyhedron is formed by the reference point and the first surface in the RGB space, and the to-be-converted point is located in the polyhedron; and
determine an intersection point between a straight line from the reference point to the to-be-converted point and a bottom surface of the polyhedron as the first intersection point.

11. The device according to claim 9, wherein the processor is configured to:
determine a distance Lx between the second intersection point and one of the two endpoints of the first side and a distance Ly between the two endpoints of the first side; and
determine the N-dimensional vector of the second intersection point based on the following formula:

$$S_{INT2} = S_{end1} \cdot \frac{Lx}{Ly} + S_{end2} \cdot \frac{Ly - Lx}{Ly}$$

wherein $S_{INT2}$ represents the N-dimensional vector of the second intersection point, $S_{end1}$ represents an N-dimensional vector corresponding to one of the two endpoints of the first side, $S_{end2}$ represents an N-dimensional vector of the other one of the two endpoints of the first side.

12. The device according to claim 11, wherein the processor is configured to:
determine the N-dimensional vector of the first intersection point based on the following formula:

$$S_{INT1} = S_{INT2} \cdot \frac{Lx1}{Ly1} + S_{vertex} \cdot \frac{Ly1 - Lx1}{Ly1}$$

wherein $S_{INT1}$ represents the N-dimensional vector of the first intersection point, $S_{vertex}$ represents an N-dimensional vector of the first vertex on the first surface, Lx1 represents a distance between the first vertex and the first intersection point, and Ly1 represents a distance between the first vertex and the second intersection point.

13. The device according to claim 12, wherein the processor is configured to:

determine the N-dimensional vector of the to-be-converted point based on the following formula:

$$S_{to\text{-}be\text{-}converted} = S_{INT1} \cdot \frac{Lx2}{Ly2} + S_{ref} \cdot \frac{Ly2 - Lx2}{Ly2}$$

wherein $S_{to\text{-}be\text{-}converted}$ represents the N-dimensional vector of the to-be-converted point, $S_{ref}$ represents the N-dimensional vector of the reference point, Lx2 represents a distance between the to-be-converted point and the first intersection point, and Ly2 represents a distance between the reference point and the first intersection point.

14. The device according to claim 9, wherein N is equal to 6.

15. The device according to claim 9, wherein the processor is further configured to:

generate a color lookup table based on a correspondence between three color channels of the three-dimensional vector of the to-be-converted point and N color channels of the N-dimensional vector of the to-be-converted point; and store the color lookup table in the display device.

16. The device according to claim 9, wherein the RGB color space is a cubic color space.

* * * * *